United States Patent [19]
Shum

[11] Patent Number: 5,963,542
[45] Date of Patent: Oct. 5, 1999

[54] ASYNCHRONOUS TRANSFER MODE CELL LOSS ESTIMATOR

[75] Inventor: Allen Shum, San Diego, Calif.

[73] Assignee: The United States of America as represented by the Secretary of the Navy, Washington, D.C.

[21] Appl. No.: 08/707,284

[22] Filed: Sep. 3, 1996

[51] Int. Cl.[6] .......................... G01R 31/08; G06F 11/00; G06C 15/00
[52] U.S. Cl. .......................... 370/232; 370/230; 370/235; 370/237; 370/252
[58] Field of Search ................................ 370/230, 232, 370/235, 237, 252, 253

[56] References Cited

U.S. PATENT DOCUMENTS

| | | |
|---|---|---|
| 5,119,367 | 6/1992 | Kawakatsu et al. . |
| 5,130,978 | 7/1992 | Mobasser . |
| 5,166,894 | 11/1992 | Saito ........................................ 370/252 |
| 5,267,232 | 11/1993 | Katsube et al. . |
| 5,274,625 | 12/1993 | Derby et al. . |
| 5,347,511 | 9/1994 | Gun . |
| 5,359,593 | 10/1994 | Derby et al. . |
| 5,361,252 | 11/1994 | Sallberg et al. . |
| 5,434,848 | 7/1995 | Chimento et al. . |
| 5,677,907 | 10/1997 | Hamada et al. ......................... 370/253 |
| 5,691,975 | 11/1997 | Hamada et al. ......................... 370/232 |

OTHER PUBLICATIONS

Gallassi et al., "Bandwidth Assignment in Prioritized ATM Networks", *IEEE Globecom 90*, vol. 3, Apr. 1990, pp. 505.2.1–505.2.5.

*Primary Examiner*—Chi H. Pham
*Assistant Examiner*—Steven Nguyen
*Attorney, Agent, or Firm*—Harvey Fendelman; Michael A. Kagan; Eric James Whitesell

[57] ABSTRACT

A method for estimating the cell loss rate of an asynchronous transfer mode statistical multiplexer comprises the steps of finding a multiplexer state probability distribution and estimating the cell loss rate from the multiplexer state probability distribution.

4 Claims, 10 Drawing Sheets

CONDITIONS:
- B = 2
- C = 40
- M = 2
- $N_1 = 2$    $\alpha_1 = 0.2$    $\beta_1 = 0.3$    $R_1 = 20$
- $N_2 = 1$    $\alpha_2 = 0.8$    $\beta_2 = 0.7$    $R_2 = 10$

| | ANALYSIS | SIMULATION | % RELATIVE ERROR |
|---|---|---|---|
| $P_{(0,(0,0))}$ | 0.09659475 | 0.09248844 | -4.44 |
| $P_{(0,(0,1))}$ | 0.10355416 | 0.11048619 | +6.27 |
| $P_{(0,(1,0))}$ | 0.19054385 | 0.18997625 | -0.30 |
| $P_{(0,(1,1))}$ | 0.26508439 | 0.26171729 | -1.29 |
| $P_{(0,(2,0))}$ | 0.08605149 | 0.08361455 | -2.91 |
| $P_{(0,(2,1))}$ | 0.12645847 | 0.12860892 | +1.67 |
| $P_{(1,(0,0))}$ | 0.00000004 | 0.00000000 | NA |
| $P_{(1,(0,1))}$ | 0.00000002 | 0.00000000 | NA |
| $P_{(1,(1,0))}$ | 0.00000002 | 0.00000000 | NA |
| $P_{(1,(1,1))}$ | 0.00000001 | 0.00000000 | NA |
| $P_{(1,(2,0))}$ | 0.00000000 | 0.00000000 | NA |
| $P_{(1,(2,1))}$ | 0.00000000 | 0.00000000 | NA |
| $P_{(2,(0,0))}$ | 0.01720326 | 0.01587302 | -8.38 |
| $P_{(2,(0,1))}$ | 0.06709292 | 0.07074116 | +5.16 |
| $P_{(2,(1,0))}$ | 0.00860163 | 0.00824897 | -4.28 |
| $P_{(2,(1,1))}$ | 0.03354646 | 0.03374578 | +0.59 |
| $P_{(2,(2,0))}$ | 0.00107521 | 0.00024997 | -330.00 |
| $P_{(2,(2,1))}$ | 0.00419331 | 0.00424947 | +1.33 |
| $\varepsilon$ | 0.04271 3551 | 0.043483995 | +1.77 |

FIG. 4

CONDITIONS:
$B = 20 \quad N_1 = 2 \quad \alpha_1 = 0.2 \quad \beta_1 = 0.5 \quad R_1 = 20$
$C = 27 \quad N_2 = 3 \quad \alpha_2 = 0.1 \quad \beta_2 = 0.8 \quad R_2 = 15$
$M = 2$

| | ANALYSIS | SIMULATION | % RELATIVE ERROR |
|---|---|---|---|
| $P_0$ | 0.426 01 402 | 0.425 331 493 | -0.16 |
| $P_1$ | 0.051 39291 | 0.050 258 995 | -2.26 |
| $P_2$ | 0.006 56487 | 0.006 659 867 | +1.43 |
| $P_3$ | 0.012 55233 | 0.012 419 752 | -1.07 |
| $P_4$ | 0.006 84444 | 0.006 959 861 | +1.66 |
| $P_5$ | 0.001 62335 | 0.001 459 971 | -11.19 |
| $P_6$ | 0.019 94044 | 0.021 119 578 | +5.58 |
| $P_7$ | 0.002 42924 | 0.002 219 956 | -9.43 |
| $P_8$ | 0.114 57789 | 0.113 537 729 | -0.92 |
| $P_9$ | 0.017 94887 | 0.017 779 644 | -0.95 |
| $P_{10}$ | 0.002 51679 | 0.002 519 950 | +0.13 |
| $P_{11}$ | 0.005 24285 | 0.005 039 899 | -4.03 |
| $P_{12}$ | 0.002 45564 | 0.002 339 953 | -4.94 |
| $P_{13}$ | 0.092 79831 | 0.093 138 137 | +0.36 |
| $P_{14}$ | 0.008 26216 | 0.008 079 838 | -2.26 |
| $P_{15}$ | 0.001 00513 | 0.000 919 982 | -9.26 |
| $P_{16}$ | 0.026 71924 | 0.027 779 444 | +3.82 |
| $P_{17}$ | 0.004 50124 | 0.004 579 908 | +1.72 |
| $P_{18}$ | 0.001 61537 | 0.001 699 966 | +4.98 |
| $P_{19}$ | 0.002 76439 | 0.002 599 948 | -6.32 |
| $P_{20}$ | 0.192 23051 | 0.193 556 129 | +0.68 |
| $\varepsilon$ | 0.080 323 504 | 0.082 366 904 | +2.48 |

FIG. 5

CONDITIONS:
    B = 10
    C = 50
    M = 2
    $N_1 = 3$    $\gamma_1 = 0.2$    $R_1 = 40$
    $N_2 = 10$   $\gamma_2 = 0.8$    $R_2 = 1$

|  | ANALYSIS | SIMULATION | (%) RELATIVE ERROR |
|---|---|---|---|
| $P_0$ | 0.83290 | 0.82978 | -0.376 |
| $P_1$ | 0.00110 | 0.00106 | -3.78 |
| $P_2$ | 0.00150 | 0.00148 | -1.35 |
| $P_3$ | 0.00220 | 0.00228 | +3.51 |
| $P_4$ | 0.00330 | 0.00350 | +5.71 |
| $P_5$ | 0.00500 | 0.00524 | +4.58 |
| $P_6$ | 0.00780 | 0.00816 | +4.41 |
| $P_7$ | 0.01170 | 0.01230 | +4.88 |
| $P_8$ | 0.01440 | 0.01444 | +0.28 |
| $P_9$ | 0.01170 | 0.01150 | -1.74 |
| $P_{10}$ | 0.10850 | 0.110260 | +1.60 |
|  | 0.105817096 | 0.1069174 | +1.03 |

FIG. 9

CONDITIONS:
  $B = 20$
  $C = 3556$
  $M = 5$
  $N_1 = 50$  $\gamma_1 = 0.6$  $R_1 = 10$
  $N_2 = 50$  $\gamma_2 = 0.7$  $R_2 = 30$
  $N_3 = 50$  $\gamma_3 = 0.5$  $R_3 = 20$
  $N_4 = 50$  $\gamma_4 = 0.3$  $R_4 = 50$
  $N_5 = 50$  $\gamma_5 = 0.2$  $R_5 = 60$

|  | ANALYSIS | SIMULATION | RELATIVE ERROR (%) |
|---|---|---|---|
| $P_0$ | 0.9079 | 0.9096 | +0.19 |
| $P_4$ | 0.0060 | 0.0050 | -20.00 |
| $P_{14}$ | 0.0057 | 0.0060 | +5.00 |
| $P_{20}$ | 0.0802 | 0.0794 | -1.01 |
|  | 0.002997045 | 0.003015543 | +0.61 |

FIG. 10

ASYNCHRONOUS TRANSFER MODE CELL LOSS ESTIMATOR

BACKGROUND OF THE INVENTION

The present invention relates to routing and congestion control in packet switching networks. More specifically, but without limitation thereto, the present invention relates to a method for estimating the cell loss rate of a finite buffer asynchronous transfer mode multiplexer.

Asynchronous transfer mode (ATM) networks are well suited to global telecommunications because of their ability to support high speed multimedia applications. However, many important problems related to the design of an ATM network remain unresolved, such as buffer dimensioning, congestion control, and message routing. Message routing in an ATM network poses challenges and difficulties that are quite different from those of current packet-switched networks. Unlike packet-switched networks that offer no performance guarantees to their clients, an ATM network must select routes that satisfy the performance requirements of all the clients admitted to the network. Congestion may be avoided simply by admitting very few clients, however this approach does not make efficient use of network resources. Efficient utilization of network resources results when as many clients as possible are admitted, but network performance for each client may be degraded. The difficulty in achieving successful routing in an ATM network lies in the lack of a method for quantifying the degree of performance degradation when the individual channels comprising the network current are shared by many clients. In an ATM network, message traffic is formatted and transmitted in units of small, fixed-length packets called cells. Cell loss, along with cell delay and delay variation, are key performance criteria.

A need thus continues for a method of estimating cell loss rate for an asynchronous transfer mode statistical multiplexer.

SUMMARY OF THE INVENTION

The method of estimating cell loss rate of an asynchronous transfer mode statistical multiplexer of the present invention is directed to overcoming the problems described above, and may provide further related advantages. No embodiment of the present invention described herein should be construed to preclude other embodiments or advantages that may exist or become obvious to those skilled in the art.

The method of the present invention for estimating the cell loss rate of an asynchronous transfer mode statistical multiplexer comprises the steps of finding a multiplexer state probability distribution and estimating the cell loss rate from the multiplexer state probability distribution.

An advantage of the method for estimating cell loss rate of the present invention is that message traffic flow may be maximized while maintaining an adequate level of performance for each network client.

The features and advantages summarized above in addition to other aspects of the present invention will become more apparent from the description, presented in conjunction with the following drawings.

BRIEF DESCRIPTION OF THE DRAWINGS

FIGS. 4 and 5 are comparisons of cell loss rates for the correlated burst multiplexer model from simulation studies versus mathematical analyses.

FIG. 9 is a comparison of the cell loss rate of the random burst multiplexer model from a simulation study versus an mathematical analysis.

FIG. 10 is a comparison of the cell loss rate of the random burst multiplexer model from a simulation study versus an approximation formula.

DESCRIPTION OF THE INVENTION

The following description is presented solely for the purpose of disclosing how the present invention may be made and used. The scope of the invention is defined by the claims.

Figure 1:
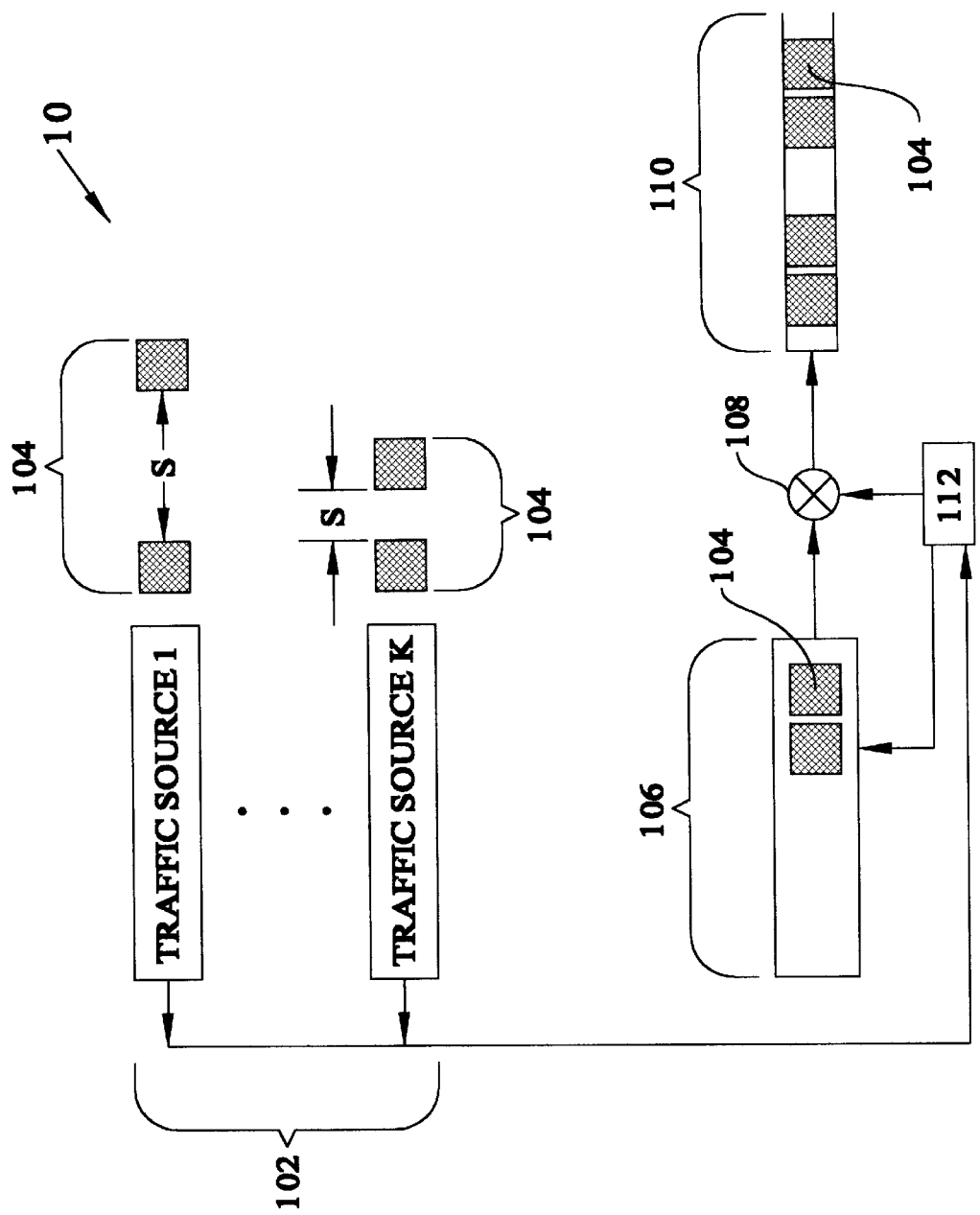
FIG. 1 is a diagram of an asynchronous transfer mode statistical multiplexer.

In FIG. 1, an exemplary asynchronous transfer mode multiplexer 10 comprises traffic sources 102 transmitting cells 104 at different rates. The difference in data rates is indicated by the spacing s' between cells 104. A gate 108 gates cells 104 from traffic sources 102 into a buffer 106. A controller 112 controls gate 108. If the incoming traffic rate to buffer 106 is less than the bandwidth of communications channel 110, all incoming cells 104 to buffer 106 may be transferred to communications channel 110 without loss. If the incoming traffic rate to buffer 106 is greater than the bandwidth of communications channel 110, buffer 106 may be filled to capacity, causing some of incoming cells 104 to be lost.

Buffer 106 can store up to B cells while communications channel 110 can transmit up to C cells per time unit. M types of traffic sources share communications channel 110. For each traffic type i there are Ni traffic sources, where i=1, 2, ... M. A traffic source of the i-th type alternates between on and off periods. During its on period the source generates $R_i$ cells per time unit, and during its off period no cells are generated. The duration of the on period is $X_i$ with $Pr(X_i=j)=\alpha_i^{j-1}(1-\alpha_i)$ for $0<\alpha_i<1$. The duration of an off period is $Y_i$ with $Pr(Y_i=j)=\beta_i^{j-1}(1-\beta_i)$ for $0<\beta_i<1$. The following conditions are also assumed:

$$\sum_{i=1}^{M} R_i N_i \frac{\frac{1}{1-\alpha_i}}{\frac{1}{1-\alpha_i}+\frac{1}{1-\beta_i}} < C \text{ and } \sum_{i=1}^{M} N_i R_i > C.$$

Figure 2:
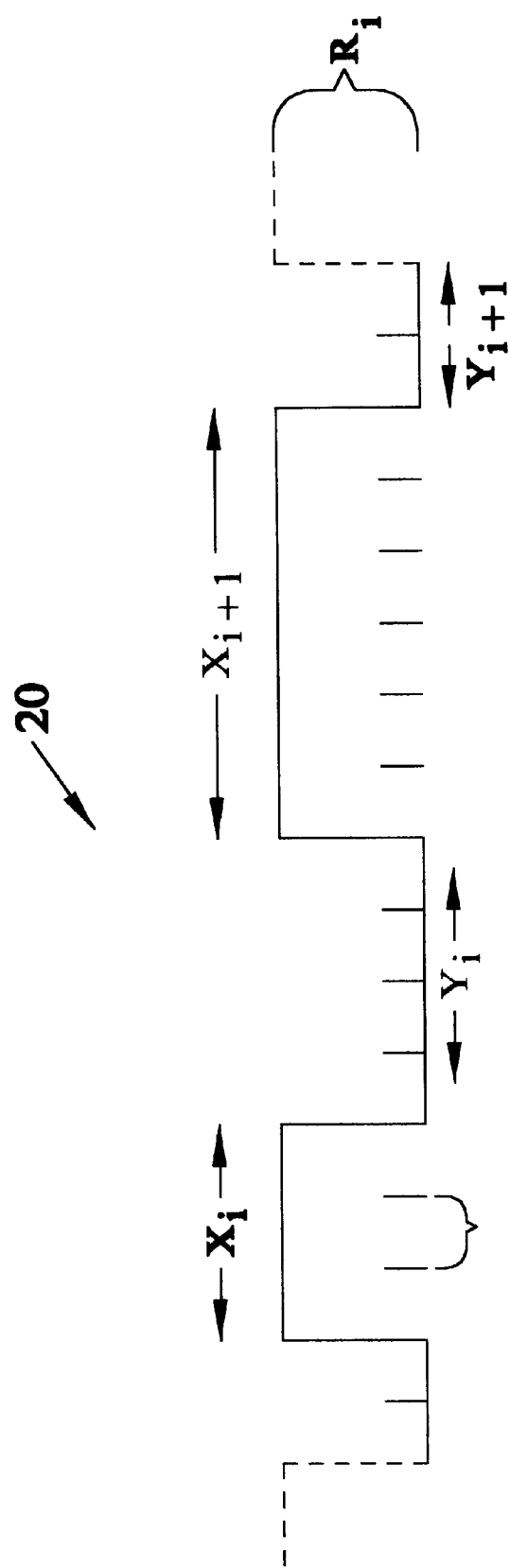
FIG. 2 is a diagram of the traffic generation rate of an on-off source as a function of time.

FIG. 2 illustrates a traffic stream 20 of an exemplary type-i on-off traffic source as a function of time. $R_i$ represents the number of cells generated per time slot. Each on period has a duration of $X_i$ sample periods $\Gamma$ and each off period has a duration of $Y_i$.

To derive the traffic loss of an ATM multiplexer the following definitions are used:

$L_k$ represents the number of cells in the buffer at the beginning of the k-th time slot;

$$L = \lim_{k \to \infty} L_k$$

represents the number of cells in the buffer at the beginning of a time slot;

$J_{ik}$ represents the number of the i-th type traffic sources that are on at the beginning of a k-th time slot;

$$S(M, \underline{N}) = \{(j_1, j_2, \ldots, j_M) \mid 0 \le j_i \le N_i, i = 1, 2, \ldots, M\}$$

$$S(B, M, \underline{N}) = \{(i, \underline{j}) \mid 0 \le i \le B, \underline{j} \in \le S(M, \underline{N})\}$$

$$\underline{J}_K = (J_{1K}, J_{2K}, \ldots, J_{MK}) \in S(M, \underline{N})$$

$$Pr(\underline{J}_{k+1} = \underline{l}_{k+1} \mid \underline{J}_k = \underline{l}_k) \text{ for } 0 \le k,$$

where $\underline{l}_k \in S(M,\underline{N})$ represents the probability that $\underline{J}_{k+1}=\underline{l}_{k+1}$ given that $\underline{J}_k=\underline{l}_k$;

$(L_k=j, \underline{J}_k=\underline{l})$ represents the joint event of $L_k=j$ and $\underline{J}_k=\underline{l}$; and $Pr(L_{k+1}=j, \underline{J}_k=\underline{l} \mid L_k=i, \underline{J}=\underline{m})=P^k(j,\underline{l}\mid i,\underline{m})$ represents the probability that the state at time k+1 is $(j,\underline{l})$ given that the state at time k is $(i,\underline{m})$.

The transition probability from the state $(L_k=i, \underline{J}_k=\underline{m})$ at time k to the state $(L_{k+1}=j, \underline{J}_{k+1}=\underline{l})$ at time k+1 is:

$$P^k(j, \underline{l} \mid i, \underline{m}) = \qquad (1)$$

$$\xi\left\{j = \max\left(\min\left(i + \sum_{x=1}^{M} R_x m_x - C, B\right), 0\right)\right\} Pr\{\underline{J}_{k+1} = \underline{l} \mid \underline{J}_{k+1} = \underline{m}\}$$

where $\xi\{A\}$ is the indicator function of the event A, i.e., $$\xi\{A\} = \begin{cases} 1 & A \text{ is true} \\ 0 & A \text{ is not true} \end{cases}$$

The transition probability for the state of the traffic sources from time k to k+1, $Pr\{\underline{J}_{k+1}=\underline{l}\mid\underline{J}=\underline{m}\}$, may be derived as follows.

Consider for now only the change in the number of on sources of type h. Let $\sigma_{h,k}$ denote the state of a traffic source of type h at time k, that is, $\sigma_{h,k}$ is either on or off. It then follows that:

$$P_r(\sigma_{h,k+1} = \text{off} \mid \sigma_{h,k} = \text{on}) = 1 - \alpha_h$$

$$P_r(\sigma_{h,k+1} = \text{on} \mid \sigma_{h,k} = \text{on}) = \alpha_h$$

$$P_r(\sigma_{h,k+1} = \text{on} \mid \sigma_{h,k} = \text{off}) = 1 - \beta_h$$

$$P_r(\sigma_{h,k+1} = \text{off} \mid \sigma_{h,k} = \text{off}) = \beta_h$$

Let i denote the number of on sources of type h at time k and m denote the number of these sources that stay on at time k+1. Then i-m sources turn off at time k+1. If l represents the number of off sources that turn on at time k+1, then $1 \le N_h - i$. The number of off sources at time k that stay off at time k+1 is thus $N_h - i - 1$. It follows that $$Pr(J_{h,k+1} = j \mid J_{h,k} = i) = \qquad (2)$$

$$\sum_{m=1}^{i} \sum_{(1:1=m-j)} \binom{i}{m}(\alpha_h)^m (1-\alpha_h)^{i-m} \binom{N-i}{l}(\beta_h)^{N_k-i-l}(1-\beta_k)^l$$

-continued where $\binom{x}{y} = \dfrac{x!}{y!(y-x)!}$ if $y \le x$ and $\binom{x}{y} = 0$ otherwise.

Since the traffic sources turn on and off independently of one another, $$Pr(\underline{J}_{k+1} = \underline{l} \mid \underline{J}_k = \underline{m}) = \prod_{i=1}^{M} Pr(J_{i,k+1} = l_i \mid J_{i,k} = m_i) \qquad (3)$$

If a state of the multiplexer is denoted by $(i,\underline{j}) \in S(B,M,\underline{N})$, then the set of states $S(B,M,\underline{N})$ forms a Markov chain. The transition probability from state $(i,\underline{m})$ at time k to state $(j,\underline{l})$ at time k+1 for the Markov chain is:

$$P^k(j,\underline{l}\mid i,\underline{m}) = \xi\{j = \max(\min(i+\underline{R}\cdot\underline{m}-C,B),0)\} Pr\{\underline{J}_{k+1}=\underline{l}\mid\underline{J}_k=\underline{m}\} \qquad (4)$$

The state evolution equation of the multiplexer may be expressed as:

$$Pr(L_{k+1} = j, \underline{J}_{k+1} = \underline{l}) = \sum_{(i,\underline{m}) \in S(B,M,\underline{m})} P^k(j, \underline{l} \mid i, \underline{m}) Pr(L_k = i, \underline{J}_k = \underline{m}) \qquad (5)$$

where L and $\underline{J}$ denote the number of cells in the buffer and the state of the traffic sources in steady state, respectively.

Given that the multiplexer is at state $(i,\underline{m}) \in S(B,M,\underline{N})$ at time k=0, the probability that the state of the multiplexer at time k is $(j,\underline{l})$, that is, the transient probability that the multiplexer is at $(j,\underline{l})$, may be recursively determined according to equation (4) by setting $Pr(L_0=i,\underline{J}_0=\underline{m})=1$ and $Pr(L_0=x, \underline{J}_0=\underline{y})=0$ for $(x,\underline{y}) \ne (i,\underline{m})$.

The time complexity of obtaining $Pr(L_k=j,\underline{J}_k=\underline{l})$ may be expressed as $$O\left(\left(k\left(B\prod_{i=1}^{M} N_i\right)\right)^2\right).$$

The probability that the state of the multiplexer is at $(j,\underline{l})$ at a random epoch sufficiently far away from time 0, the steady state probability that the multiplexer is at $(j,\underline{l})$, satisfies the following fixed-point equation:

$$Pr(L = j, \underline{J} = \underline{l}) = \qquad (6)$$

$$\sum_{(i,\underline{m}) \in S(B,M,\underline{m})} Pr(L = j, \underline{J} = \underline{l} \mid L = i, \underline{J} = \underline{m}) Pr(L = i, \underline{J} = \underline{m})$$

Although the probability $Pr(l=j,\underline{J}=\underline{l})$ may be computed recursively using equation (4) by letting $k \to \infty$, this may require a prohibitively large number of iterations. The steady state probabilities may be obtained iteratively by the steps implemented by way of example in the following procedure:

k=0;

for $((i,\underline{j}) \in S(B,M,\underline{N}))$ $(p^k)_{(i,\underline{j})} = x_{(i,\underline{j})}$, where $0 \leq x_{(i,\underline{j})} \leq 1$ and $$\sum_{(i,\underline{j}) \in S(B,M,\underline{N})} x_{(i,\underline{j})} = 1;$$

for $((i,\underline{j}) \in S(B,M,\underline{N}))$ $(p^{k+1})_{(i,\underline{j})} = 0;$ pick $\delta > 0$ as the exit threshold;
while $(|p^{k+1}_{(i,\underline{j})} - p^{k}_{(i,\underline{j})}| \geq \delta$ for any $(i,\underline{j}) \in S(B,M,\underline{N})$
{
k=k+1;
for $((i,\underline{j}) \in S(B,M,\underline{N}))$
{
pick any $\epsilon_k$ such that $0 < \epsilon_k < 1$;

$$(p^k)_{(i,\underline{j})} = (1 - \epsilon_k) p^{k-1}_{(i,\underline{j})} +$$

$$\epsilon_k \sum_{(l,\underline{m}) \in S(B,M,\underline{N})} \xi\{i = \max(\min(l + \underline{R} \cdot \underline{m} - C, B), 0\} p_{\underline{j},\underline{m}} p^{k-1}_{(l,\underline{m})};$$

};

$$S = \sum_{(i,\underline{j}) \in S(B,M,\underline{N})} p^k_{(i,\underline{j})};$$

for $((i, \underline{j}) \in S(B, M, \underline{N}))$ $$p^k_{(i,\underline{j})} = \frac{p^k_{(i,\underline{j})}}{S};$$

};

wherein:
k represents the iteration number;
$(i,\underline{j})$ represents a state of the statistical multiplexer;
$p^k_{(i,\underline{j})}$ represents a multiplexer state probability of $(i,\underline{j})$ during iteration k;
M represents the number of traffic types;
$\underline{N}$ represents the number of traffic sources of each type.
B represents the cell buffer size of the multiplexer;
$S(B,M,\underline{N})$ represents the set of all possible states of the multiplexer;
C represents the maximum cell transmission rate of the multiplexer; and
$P_{\underline{j},\underline{m}}$ represents a state transition probability from $\underline{j}$ to $\underline{m}$.
This program terminates when a consistent set of $p_{(i,\underline{j})}$'s satisfying equation (6) is found. The condition $$\sum_{i=1}^{M} R_i N_i \frac{\frac{1}{1 - \alpha_i}}{\frac{1}{1 - \alpha_i} + \frac{1}{1 - \beta_i}} < C$$

ensures that the Markov chain is ergodic, which in turn ensures that a unique steady state distribution solution exists. This implies that if the procedure converges, it converges to a unique solution. In general, existence of a solution does not imply convergence. Computational experience suggests, however, that the procedure always converges.

The space complexity of the procedure described above may be expressed as $$O\left(B \prod_{i=1}^{M} N_i\right)$$

and the time complexity as $$O\left(B^2 \prod_{i=1}^{M} N_i^2\right).$$

Once the state probability distribution of the multiplexer is determined, the cell loss rate at the multiplexer may be found as follows.
Let:
NL(L=i, $\underline{J}=\underline{l}$) represent the number of cells lost at the end of a time slot given that at the start of the time slot the number of cells in the buffer is i and the state of the traffic sources is $\underline{l}$.
NA(L=i, $\underline{J}=\underline{l}$) represent the number of cells that arrive during a time slot k given that at the start of the time slot the number of cells in the buffer is i and the state of the traffic sources is $\underline{l}$.
LR(L=i, $\underline{J}=\underline{l}$) represent the cell loss rate during a time slot given that the number of cells in the buffer is i at the start of the time slot and the state of the traffic sources is $\underline{l}$.
Then:

$$NL(L = i, \underline{J} = \underline{l}) = \max\left(\sum_{j=i}^{M} R_j l_j - (B - i + C), 0\right) \quad (7)$$

$$NA(L = i, \underline{J} = \underline{l}) = \sum_{j=1}^{M} R_j l_j \quad (8)$$

$$LR(L = i, \underline{J} = \underline{l}) = \frac{NL(L = i, \underline{J} = \underline{l})}{NA(L = i, \underline{J} = \underline{l})} \quad (9)$$

The cell loss rate during a time slot may be calculated from the formula:

$$\sum_{(i,\underline{j}) \in S(B,M,\underline{N})} LR(L = i, \underline{J} = \underline{j}) Pr(L = i, \underline{J} = \underline{j}) \quad (10)$$

Equation 10 may also be conveniently expressed as $$\sum_{(i,\underline{j}) \in S(B,M,\underline{N})} \frac{\max\left(\sum_{j=1}^{M} R_i l_i - (B - i + C), 0\right)}{\sum_{j=1}^{M} R_j l_j} P_{(i,\underline{j})} \quad (11)$$

Equations (7) through (11) describe the steps for calculating the steady state loss probability of the multiplexer once the steady state probability of the multiplexer at each state $(i,\underline{m}) \in S(B,M,\underline{N})$ is found.

Simulation studies for two arbitrary scenarios were conducted to evaluate the steady state cell loss probabilities predicted by the exemplary procedure above. The resulting comparison between the simulation results and the predicted cell loss probabilities are tabulated in FIGS. 4. and 5. In FIG. 4, $P_{(i,\underline{j})}$ denotes the steady state probability that the buffer content of the multiplexer at the start of a time slot is i and the state of the traffic sources is j. In FIG. 5, $P_i$ denotes the steady state probability that the buffer content of the multiplexer at the start of a time slot is i. In FIGS. 4 and 5, relative error is defined as 100%×(simulation results—prediction). $\epsilon$ is defined as the steady state cell loss probability. The results provide substantial support for the validity of the procedure. A problem with the computation is that the space and time complexities are exponential in M as described above. The space and time complexities make it impractical to evaluate multiplexers with significant values of M, $N_i$, and B. To overcome this difficulty, an approximation multiplexer model is needed to accommodate large values of $N_i$ and M more efficiently.

Figure 3:
FIG. 3 is a timing diagram of the traffic generation rate of a correlated burst on-off source as a function of time.

An approximation multiplexer model may be formulated as follows. The ATM statistical multiplexer analyzed above is subject to heterogeneous groups of on-off traffic sources. The durations of the on and off periods of a traffic source are geometrically distributed with parameters $\alpha$ and $\beta$, respectively. A sample path of the state of a traffic source in the case where $\alpha$ and $\beta$ are close to 1 is illustrated in FIG. 3. Given that the state of the traffic source is on at time k, it is highly probable that the traffic source is still on at time k+$\delta$k even if $\delta$k is large. When cell generation tends to cluster together, the generation process may be said to be positively correlated. The correlativeness of a traffic source has a significant impact on the cell loss characteristic of a statistical multiplexer, particularly when the buffer size of the statistical multiplexer is large, since the large buffer permits the cells to interact. Since the on-off traffic source model can account for the correlated nature of cell arrivals, that on-off model is referred to herein as the correlated burst on-off model. Under certain asymptotic conditions, the correlated burst on-off model may reasonably be replaced by a simpler non-correlated burst on-off model, as follows.

Figure 6:
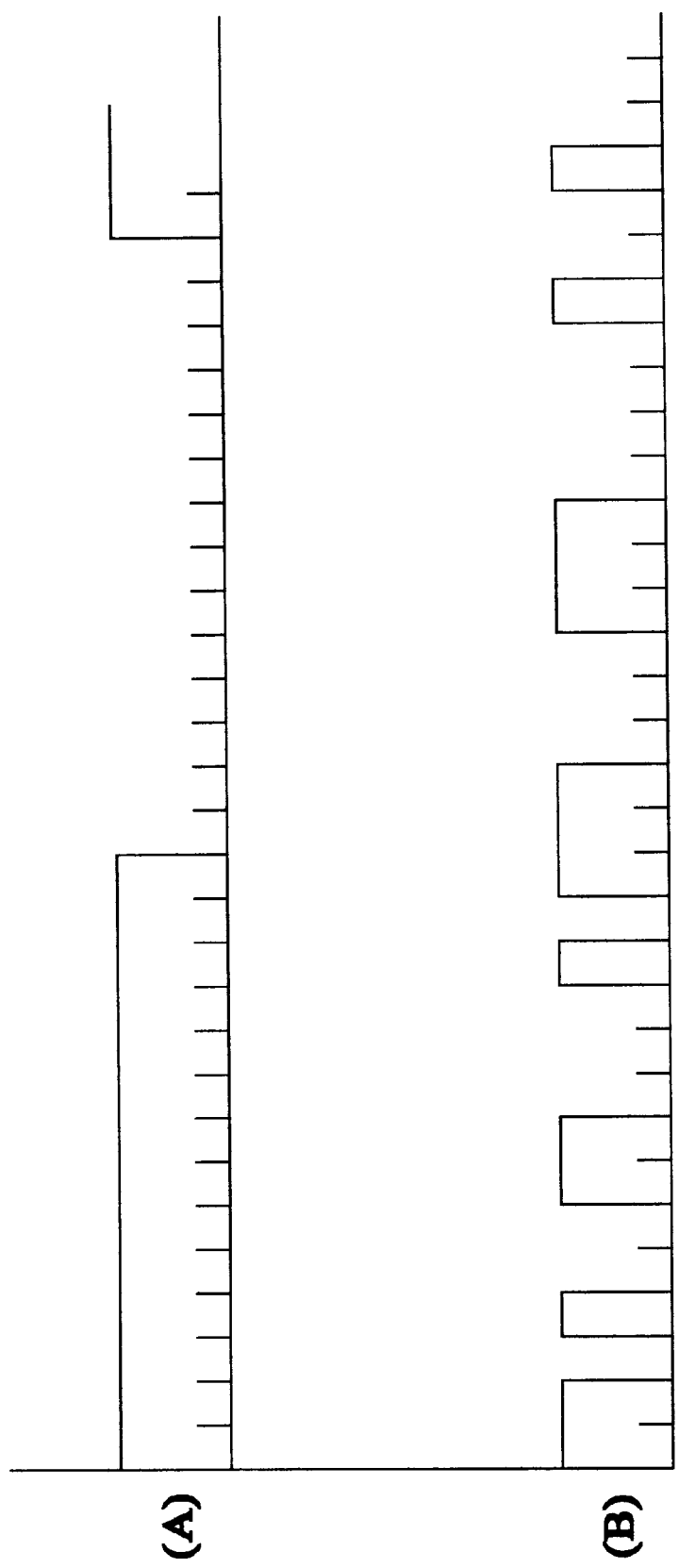
FIG. 6 is a diagram of the traffic generation rates of a correlated burst on-off source and a random burst on-off source as a function of time.

FIG. 6 illustrates sample paths of the cell generation pattern of two traffic sources. Sample path 6(A) is constructed according to the correlated burst on-off model with $\alpha=\beta=0.9$. In this case, $$\frac{\frac{1}{1-\alpha}}{\frac{1}{1-\alpha}+\frac{1}{1-\beta}} = 0.5.$$

Sample path 6(B) is constructed such that at each time slot the traffic source turns on and off at some time k with the same probability of 0.5, independent of the value of k. This on-off traffic model is referred to herein as the random burst on-off model. Over a long observation period, the total durations of all the on periods of both sample paths 6(A) and 6(B) are approximately the same; however, path 6(A) is much more positively correlated than path 604, and would therefore effect a much higher cell loss as a multiplexer.

Figure 7:
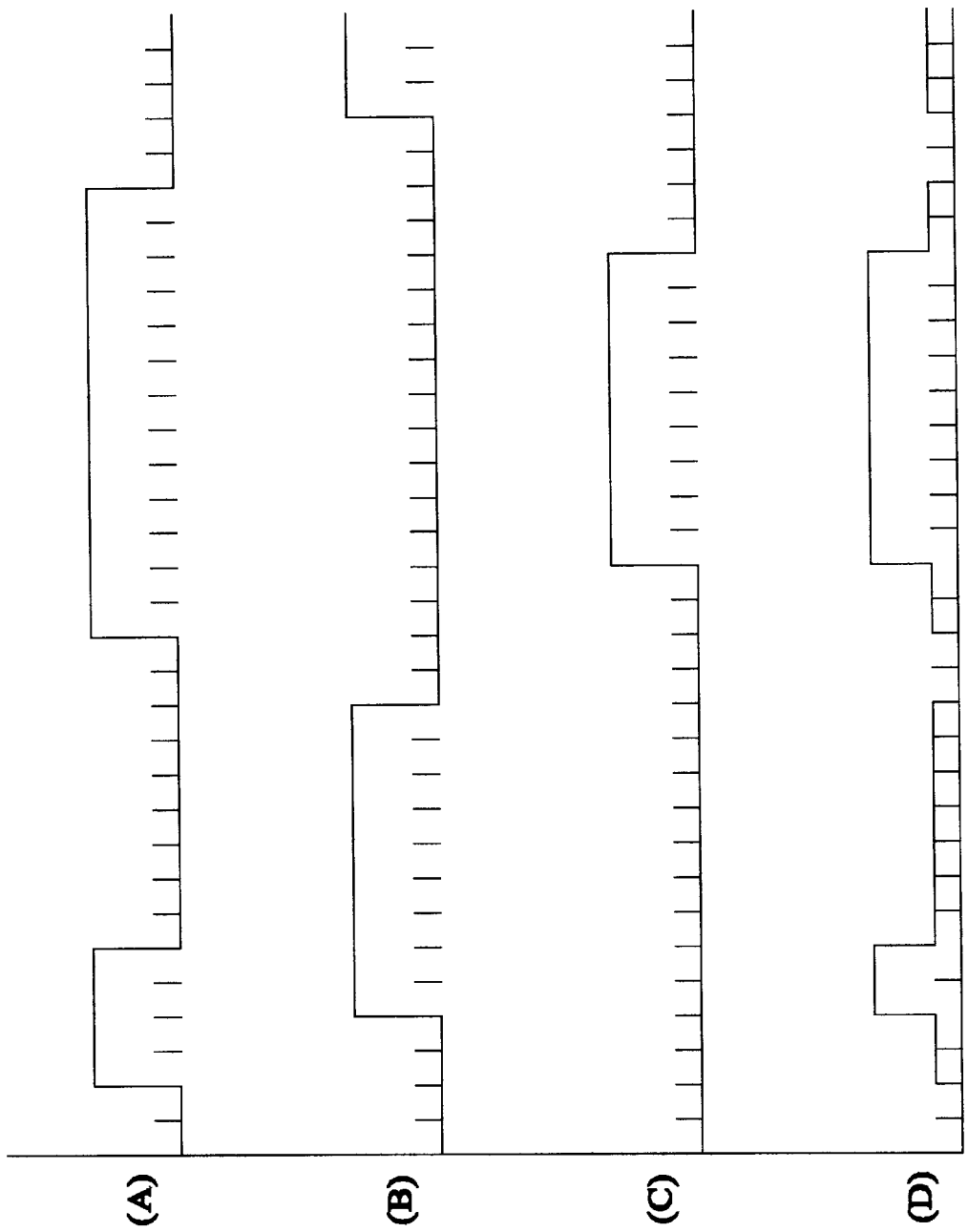
FIG. 7 is a diagram of the aggregate traffic generation rate of three superimposed correlated burst on-off traffic sources as a function of time.
Figure 8:
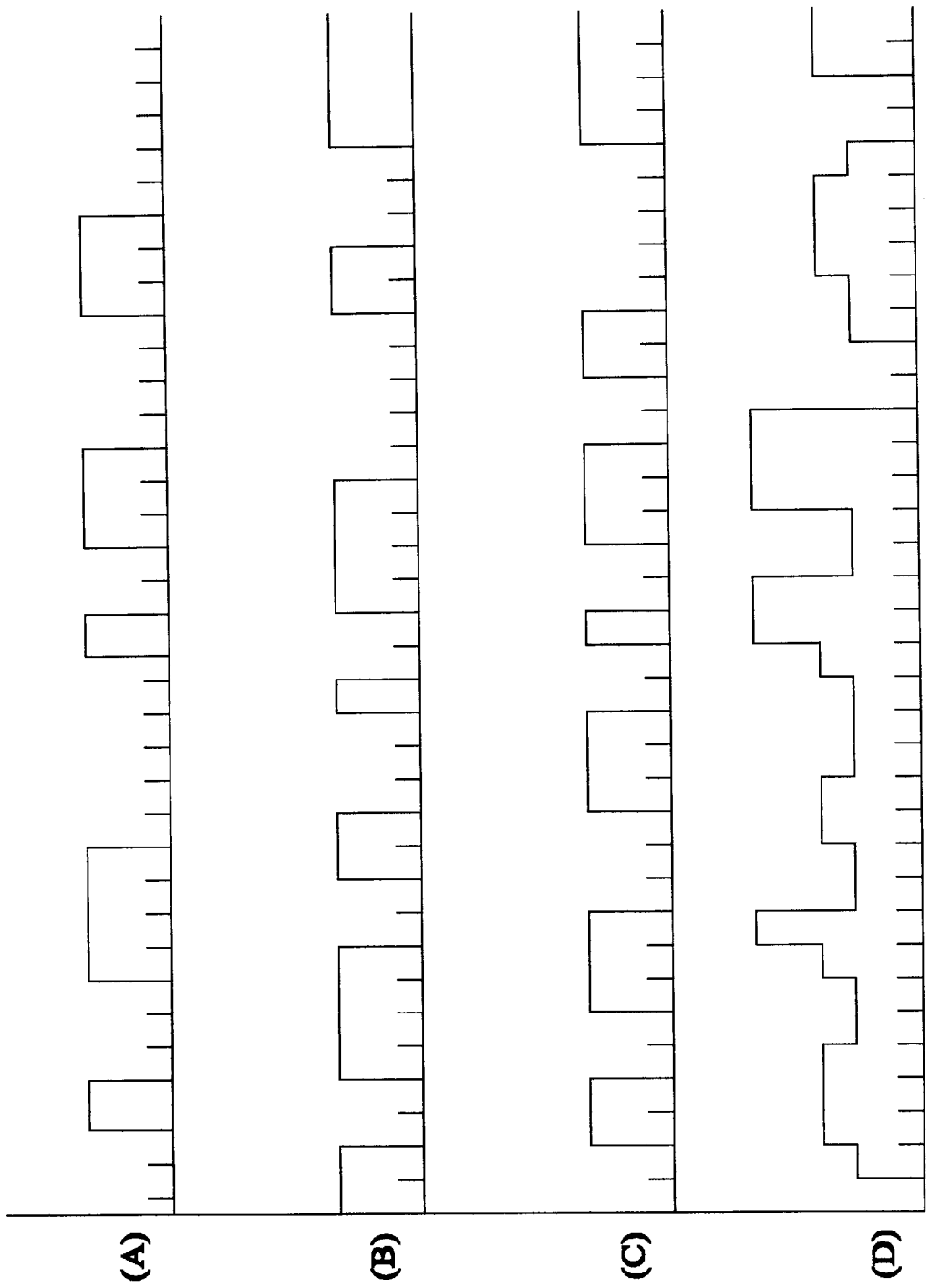
FIG. 8 is a diagram of the aggregate traffic generation rate of three superimposed random burst on-off traffic sources as a function of time.

FIG. 7(d) illustrates the superposition of three exemplary traffic streams 7(a), 7(b), and 7(c) of the correlated burst on-off traffic sources. FIG. 8(d) illustrates the superposition of three exemplary traffic streams 8(a), 8(b), and 8(c) of the random burst on-off traffic sources. The superposition of N correlated burst on-off traffic streams is stochastically similar to the superposition of N random burst on-off traffic streams when N is large. Since the superposition of a large number of random burst on-off traffic streams is stochastically similar to that of correlated burst on-off traffic streams, the cell loss rates of the respective superpositions at a multiplexer are also similar. This similarity allows replacing the correlated burst traffic streams with the random burst traffic streams in the approximation multiplexer model.

Because the random burst traffic streams have much simpler analytical properties, the analysis of the approximation multiplexer model is also simplified. The following definitions are used to describe the approximation multiplexer model:

M denotes the number of different traffic source types;

$N_i$ denotes the number of traffic sources of the i-th type for i=1,M;

$R_i$ denotes the number of cells generated by an i-th type traffic source in a time slot during the source's on periods;

B denotes the maximum number of cells that may be buffered at the multiplexer;

C denotes the number of cells that may be transmitted by the output link of the multiplexer per time slot, where $C \geq 1$;

(i) An on period of a traffic source of the i-th type lasts $X_i$ time slots, where X is geometrically distributed with parameter $\gamma_i$;

(ii) An off period of a traffic source of the i-th type lasts $Y_i$ time slots, where $Y_i$ is geometrically distributed with parameter $1-\gamma_i$;

(iii) The number of cells at the buffer at a time k+1 is computed as $\max(\min(i+\underline{R}\cdot\underline{J}-C,B),0)$, where i is the number of cells in the buffer at time k; $\underline{J}$ is the state of the traffic sources at the start of time k;

$$(iv) \sum_{i=1}^{M} R_i N_i \gamma_i < C;$$

and $$(v) \sum_{i=1}^{M} R_i N_i \geq C.$$

The difference between the correlated burst on-off model and the random burst model is that the on and off periods are determined by two parameters $\alpha_i$ and $\beta_i$ in the correlated model, while in the random burst model the on and off periods are determined only by the single parameter $\gamma_i$. If:

$B_k$ represents the number of cells in the buffer at the beginning of the k-th time slot;

$J_{ik}$ represents the number of the i-th type traffic sources that are on at the beginning of the k-th time slot;

$$S(M, \underline{N}) = \{(j_1, j_2, \ldots, j_M) \mid 0 \leq j_i \leq N_i \ i = 1, 2, \ldots, M\};$$

$$\underline{J}_k = (J_{1k}, J_{2k}, \ldots, J_{Mk}) \in S(M, \underline{N});$$

$$\xi\{A\} = \begin{cases} 1 & A \text{ is true} \\ 0 & A \text{ is not true;} \end{cases}$$

$\Pr(B_{k+1}=j \mid B_k=i, \underline{J}_k=\underline{j})$ represents the probability that $B_{k+1}=j$ given that $B_k=i$ and $\underline{J}_k=\underline{j}$;

$\Pr(B_{k+1}=j \mid B_k=i)$ represents the probability that that $B_{k+1}=j$ given that $B_k=i$; and $\Pr(B_{k+1}=j)$ represents the probability that $B_{k+1}=j$, then:

$$Pr(B_{k+1}=j \mid B_k=i, \underline{J}_k=\underline{j}) = \xi\{j=\max(\min(i+\underline{R}\cdot\underline{j}-C,B),0)\} \quad (12)$$

$$Pr(B_{k+1} = j \mid B_k = i) = \qquad (13)$$

$$\sum_{\underline{j} \in S(M,\underline{N})} \xi\{j = \max(\min(i + \underline{R} \bullet \underline{j} - C, B), 0)\} Pr(\underline{J}_k = \underline{j})$$

$$Pr(B_{k+1} = j) = \sum_{i=0}^{B} \left[ \sum_{\underline{j} \in S(M,\underline{N})} \xi\{j = \max(\min(i + \underline{R} \bullet \underline{j} - C, B), 0)\} Pr(\underline{J}_k = \underline{j}) \right] Pr(B_k = i) \qquad (14)$$

In steady state, the number L of cells in the buffer is independent of the time k. The number of on traffic sources of each type at a time slot is also independent of the time k; therefore the following fixed-point relation holds for $Pr(L=i)$ for $i=0,1, \ldots, B$:

$$Pr(L = j) = \sum_{i=0}^{B} \left[ \sum_{\underline{j} \in S(M,\underline{N})} \xi\{j = \max(\min(i + \underline{R} \bullet \underline{j} - C, B), 0)\} Pr(\underline{J}_k = \underline{j}) \right] Pr(L = i) \qquad (15)$$

where $$Pr(\underline{J} = \underline{j}) = \prod_{i=1}^{M} \binom{N_i}{j_i} \alpha_i^{j_i} (1 - \alpha_i)^{N_i - j_i} \qquad (16)$$

The $Pr(L=i)$ functions may be obtained iteratively, for example the following procedure may be used to obtain the distribution function of the variable L. In this example, $p_i$ denotes $Pr(L=i)$:

k = 0
$(p^k)_i = 1/B$ for $i = 0, 1, 2, \ldots, B$
$(p^{k+1})_i = 0$ for $i = 0, 1, 2, \ldots, B$
while $(|p^{k+1}_i - p^k_i| < \delta$ for $0 \leq i \leq B)$
{
  k = k + 1;
  for $(0 \leq j \leq B)$
  {
    pick $\epsilon_k$ such that $0 < \epsilon_k < 1$;
    $p^k_j = (1 - \epsilon_k)p^{k-1}_j +$
    $\epsilon_k \sum_{i=0}^{B} \left[ \sum_{\underline{j} \in S(M,\underline{N})} \xi\{j = \max(\min(i + \underline{R} \bullet \underline{j} - C, B), 0)\} Pr(\underline{J} = \underline{j}) \right] p^{k-1}_i$;
  };
  $S = \sum_{j=0}^{B} p^k_j$;
  for $(0 \leq i \leq B)$
    $p^k_i = p^k_i / S$;
};

This procedure terminates whenever a consistent set of $p^k_j = Pr(L=j)$'s is found.

Since the system is ergodic, there exists a unique solution to the iteration method. The existence of a solution does not guarantee convergence of the iteration; however computational experience suggests that the procedure always converges. Because each iteration requires $$O\left(B^2 \prod_{i=1}^{M} N_i\right)$$

computations, this method becomes impractical for large values of $N_i$ and M.

After $Pr(L=i)$ for $i=0,1,2, \ldots, B$ are obtained, the steady state cell loss probability of the multiplexer may be determined from a heuristic computation as follows:

If:

NL(k,j) is the number of cells that are lost in a time slot, given that there are k cells buffered at the beginning of the time slot and that j is the state of the traffic sources at the beginning of the time slot;

NL(k) is the number of cells that are lost in a time slot, given that there are k cells in the beginning of the time slot;

NA(k,j) is the number of cells that arrive in a time slot, given that there are k cells in the beginning of the time slot and that j is the state of the traffic sources at the beginning of the time slot;

NA is the expected number of cells that arrive in a time slot;

NL is the expected number of cell losses in a time slot; and $C_L$ is the steady state cell loss probability of the multiplexer, then:

$$NL(k, \underline{j}) = \begin{cases} \underline{R} \cdot \underline{j} - (B - k + C)B - k + C \leq \underline{R} \cdot \underline{j} \\ 0 \text{ otherwise} \end{cases} \qquad (17)$$

$$NL(k) = \sum_{\underline{j} \in S(M,\underline{N})} NL(k, \underline{j}) Pr(\underline{J} = \underline{j}) \qquad (18)$$

$$NL = \sum_{k=0}^{B} \{NL(k) Pr(L = k)\} \qquad (19)$$

$$NA(k, \underline{j}) = \underline{R} \cdot \underline{j} = \sum_{i=1}^{M} R_i j_i \qquad (20)$$

$$NA(k) = \qquad (21)$$

$$\sum_{\underline{j} \in S(M,\underline{N})} NA(k, \underline{j}) Pr(\underline{J} = \underline{j}) = \sum_{\underline{j} \in S(M,\underline{N})} \{(\underline{R} \cdot \underline{j}) Pr(\underline{J} = \underline{j})\}$$

$$NA = \sum_{\underline{j} \in S(M,\underline{N})} \{(\underline{R} \cdot \underline{j}) Pr(\underline{J} = \underline{j})\} \qquad (22)$$

The cell loss probability during a time slot may be expressed as:

$$C_L = \frac{NL}{NA} = \frac{\sum_{k=0}^{B}\left\{\sum_{j\in S(M,\underline{N})}(\underline{R}\cdot j - (B-k+C))Pr(\underline{J}=j)\xi(\underline{R}\cdot j \geq B-k+C)\right\}Pr(L=k)}{\sum_{j\in S(M,\underline{N})}\{(\underline{R}\cdot j)Pr(\underline{J}=j)\}} \quad (23)$$

From the above expression, the cell loss probability may be obtained in principle; however, the computational complexity is exponential in the parameters $N_i$, $R_i$, and M. The following heuristic makes the computation feasible. Note that:

$$\sum_{i=0}^{B}\left[\sum_{j\in S(M,\underline{N})}\xi\{j=\max(\min(i+\underline{R}\cdot j - C, B), 0)\}Pr(\underline{J}=j)\right] = \quad (24)$$

$$\sum_{i=0}^{B}\sum_{j\in S_{i,j,\underline{j}}}Pr(\underline{J}=j)$$

where $$S_{i,j,\underline{j}} = \{\underline{i}|j = \max(\min(i+\underline{R}\cdot\underline{i}-C,B),0)\}$$

For a fixed pair (i,j), the set $S_{i,j,\underline{j}}$ should be much smaller than $S(M,\underline{N})$. A procedure may be developed that enumerates the set $S_{i,j,\underline{j}}$ without testing each $j \in S(M,\underline{N})$ such as set forth in the following example.

The set $S_{i,j,\underline{j}}$ may be partitioned into $S_{i,j,\underline{j}}[j=0]$, $S_{i,j,\underline{j}}[1\leq j<B]$ and $S_{i,j,\underline{j}}[B\geq j]$, where $$S_{i,j,\underline{j}}[j=0] = \{\underline{i}\in S(M,\underline{N}):\underline{R}\cdot\underline{i}\leq C-i\} \quad (25)$$

$$S_{i,j,\underline{j}}[1\leq\underline{j}<B] = \{\underline{i}\in S(M,\underline{N}):\underline{R}\cdot\underline{i}=C+j-i\} \quad (26)$$

$$S_{i,j,\underline{j}}[B=j] = \{\underline{i}\in S(M,\underline{N}):\underline{R}\cdot\underline{i}\geq C+B-i\} \quad (27)$$

The following sets are defined:

$$S_{[1\ldots M]}[\leq k] = \left\{\underline{j}\in S(M,\underline{N})\left|\sum_{i=1}^{M}R_i j_i \leq k\right.\right\}$$

$$S_{[1\ldots M]}[=k] = \left\{\underline{j}\in S(M,\underline{N})\left|\sum_{i=1}^{M}R_i j_i = k\right.\right\}$$

$$S_{[1\ldots M]}[\geq k] = \left\{\underline{j}\in S(M,\underline{N})\left|\sum_{i=1}^{M}R_i j_i \geq k\right.\right\}$$

To enumerate the sets $S_{1\ldots M}[\leq k]$, $S_{1\ldots M}[=k]$ and $S_{1\ldots M}[\geq k]$ without testing each $\underline{j} \in S(M,\underline{N})$, the following notation is defined:

$$S_i[=k] = \{j | 0 \leq j \leq N_i, R_i j = k\}$$

$$A \times B = \{(i,j) | i \in A, j \in B\}$$

$$S_{[1\ldots M]}[=k] = \begin{cases} \sum_{j\in S_i[\leq k]}(S_{[1\ldots m-1]}[=(k-jR_m)]\times\{j\}) & M \geq m > 1 \\ \{j | 0 \leq j \leq N_1, jR_1 \leq k\} & m=1 \end{cases}$$

where the summation symbol $\Sigma$ represents the union set operation. Let:

$$S_i[\leq k] = \{j | 0 \leq j \leq N_i, R_i j \leq k\}$$

$$S_{[1\ldots M]}[\leq k] = \begin{cases} \sum_{j\in S_i[\leq k]}(S_{[1\ldots m-1]}[\leq (k-jR_m)]\times\{j\}) & M \geq m > 1 \\ \{j | 0 \leq j \leq N_1, jR_1 \leq k\} & m=1 \end{cases}$$

$$S_i = \{j | 0 \leq j \leq N_i\}$$

Using the enumeration scheme above, the summation $$\sum_{j\in S(M,\underline{N})}$$

of the iterative procedure may be performed without testing each $\underline{j} \in S(M,\underline{N})$. This reduces the amount of computation considerably. The following procedure may be used to approximate the cell loss probability for large values of $N_i$.

When $N_i$ is large for each value of $i=1,2,\ldots,M$, diffusion approximation may be used to estimate $Pr(\underline{J}=\underline{j})$. If $N_i$ is large, $N_i\gamma_i \ll 1$ and $N_i\gamma_i(1-\gamma_i) \ll 1$, then by the Laplace-DeMoivre Theorem, $$Pr(J_i = j) \sim \frac{1}{\sqrt{2\pi\sigma_i^2}}e^{\left\{\frac{-(j-\mu_i)^2}{2\sigma_i^2}\right\}} \quad (28)$$

The discrete random variable $J_i$ may be replaced with a continuous variable $Y_i$ having the following probability distribution:

$$Pr(Y_i \leq x) \sim \frac{1}{K_i\sqrt{2\pi\sigma_i^2}}\int_0^{N_i}e^{\left\{\frac{-(\tau-\mu_i)^2}{2\sigma_i^2}\right\}}d\tau \quad 0 < x \leq N_i \quad (29)$$

where $$K_i = \frac{1}{\sqrt{2\pi\sigma_i^2}}\int_0^{N_i}e^{\left\{\frac{-(j-\mu_i)^2}{2\sigma_i^2}\right\}}d\tau.$$

$Y_i$ is approximately Gaussian.

Finally, $$Y \equiv \sum_{i=1}^{M}R_i Y_i. \quad (30)$$

Y is also approximately Gaussian with a mean of $$\mu = \sum_{i=1}^{M}R_i N_i \gamma_i$$

and a variance of $$\sigma^2 = \sum_{i=1}^{M} R_i^2 N_i \gamma_i (1 - \gamma_i).$$

The distribution function of Y may be expressed as $$Pr(Y \le x) = \frac{1}{K\sqrt{2\pi\sigma^2}} \int_0^x e^{\left\{\frac{-(\tau-\mu)^2}{2\sigma^2}\right\}} d\tau \quad 0 < x \le \sum_{i=1}^{M} R_i N_i \quad (31)$$

where $$K = \frac{1}{\sqrt{2\pi\sigma^2}} \int_0^{\sum_{i=1}^{M} R_i N_i} e^{\left\{\frac{-(j-\mu)^2}{2\sigma^2}\right\}} d\tau$$

The Pr(L=i)'s may be obtained from the following iterative procedure in which $$\sum_{j \in S_{i,j,\underline{j}}} P(\underline{J} = \underline{j})$$

is approximated by $$\sum_{j \in S_{i,j,\underline{j}}} P(\underline{J} = \underline{j}) \sim \xi\{j = 0\} Pr(Y \le C - i) + \quad (32)$$

$$\xi\{0 < j < B\} Pr(C + j - i - 1 \le Y \le C + j - i) +$$

$$\xi\{B = j\}(1 - Pr(Y \le C + B - i)):$$

k = 0;

$(p^k)_i = 1/B$ for i = 0, 1, 2, ... , B $(p^{k+1})_i = 0$ for i = 0, 1, 2, ... , B while $(|p_i^{k+1} - p_i^k| < \delta$ for $0 \le i \le B)$

{ k = k + 1;

for (0 ≤ j ≤ B)

{ pick $\epsilon_k$ such that $0 < \epsilon_k < 1$;

$$p_j^k = (1 - \epsilon_k) p_j^{k-1} + \epsilon_k \sum_{j \in S_{i,j,\underline{j}}} Pr(\underline{J} = \underline{j}) p_i^{k-1}$$

};

$$S = \sum_{j=0}^{B} p_j^k$$

for (0 ≤ j ≤ B)

$p_i^k = p_i^k / S$;

}

Note that:

$$\sum_{j \in S(M,\underline{N})} \{(\underline{R} \cdot \underline{j} - (B - k + C)) Pr(\underline{J} = \underline{j})\} \equiv \quad (33)$$

$$\sum_{j \in S_{k,\underline{j}}} \{(\underline{R} \cdot \underline{j} - (B - k + C)) Pr(\underline{J} = \underline{j})\}$$

where $S_{k,\underline{j}} \equiv \{\underline{j} \in S(M, \underline{N}): B - k + C \le \underline{R} \cdot \underline{j}\}$ and $$\sum_{j \in S_{k,\underline{j}}} \{(\underline{R} \cdot \underline{j} - (B - k + C)) Pr(\underline{J} = \underline{j})\} \sim \int_{a_k}^{\sum_{i=1}^{M} R_i N_i} (\tau - a_k) f_y(\tau) d\tau \quad (34)$$

where $a_k = B - k + C$ and

Finally, $$NA \sim \sum_{i=1}^{M} \{R_i N_i \gamma_i\}. \quad (35)$$

The cell loss probability is approximately $$CL \sim \frac{\sum_{k=0}^{B} \left( \int_{a_k}^{\sum_{i=0}^{M} R_i N_i} (\tau - a_k) f_y(\tau) d\tau \right) Pr(L = K)}{\sum_{i=1}^{M} \{R_i N_i \gamma_i\}} \quad (36)$$

Using this approximation, the computation at each iteration step is reduced to the evaluation of $B^2$ error function integrals. The complexity of evaluating an integral may be expressed as $$O\left(\sum_{i=1}^{M} R_i N_i\right);$$

therefore, the overall complexity of the approximation procedure may be expressed as $$O\left(B^2 \sum_{i=1}^{M} R_i N_i\right).$$

If each integral is obtained from a table lookup, the complexity of the algorithm is reduced to $O(B^2)$ with virtually the same results.

FIG. 10 is an example illustrating the advantage of analyzing the random burst multiplexer model over the correlated burst model. In that example, obtaining the cell loss rate of the correlated burst model requires an order of $$B^2 \prod_{i=1}^{5} N_i^2,$$

or $3.19 \times 10^{19}$ computations; for the random burst model, the approximation method requires an order of $B^2$, or 400 computations.

The present invention may be applied to an exemplary ATM network as follows. In this example, the ATM network comprises a single transmission link. The maximum transmission link efficiency achievable depends on the following parameters:

C the capacity of the transmission link;

B the size of the buffer;

N the number of connections supported;

TP the traffic profile of each connection; and

Q the quality of service required by each connection.

The traffic profile TP is specified in terms of the peak traffic rate, the mean traffic rate, and the expected burst period of a connection.

The quality of service Q is usually defined in terms of both the maximum cell loss rate and the maximum end-to-end delay tolerable by the connection. In this simplified example, Q is defined only in terms of the maximum cell loss rate tolerable by the connection.

The transmission link is statistically shared or multiplexed among N connections. When the total cell generation rate of the N connections is below the capacity of the transmission link C, no cell loss occurs; however, when the instantaneous total traffic rate exceeds C, the excess cells will be stored in the buffer. When the buffer is full, cells will be dropped.

A voice encoder of a connection samples voice signals at 8000 samples/second and each sample is encoded into an 8-bit unit. A cell is packed with 48 samples. The voice encoder has a silence detector and generates samples only when the speaker is talking. The expected burst period, the interval during which the speaker is talking, is 0.96 seconds. The expected silence period, the interval during which the speaker is silent, is 1.60 seconds. The traffic profile of each voice connection is as follows:

The peak cell rate is 167 cells/second.

The mean cell rate of the connection is 62 cells/second.

The quality of service required at each connection is $10^{-7}$ and an overall cell loss rate of $10^{-8}$ at the transmission link suffices to effect a maximum cell loss rate of $10^{-7}$ for each connection.

The transmission link can transmit up to 10 Mbits/sec ($^{18}$ 26000 cells per second). The buffer can store up to 100 cells. According to the multiplexer model with correlated burst on-off traffic sources, the maximum number of connections that can be supported by the transmission link is N=310. The maximum efficiency is approximately 310×62/26000=0.74.

Using the assumptions in the example above, with the exception that the transmission link capacity is 1 Mbit/sec, the maximum number of connections that can be supported by the network is N=200. The maximum efficiency is approximately 200×62/26000 cells per second=0.48.

The network in the first example has a much higher statistical gain than that of the second example, which corroborates the proven principle that high capacity networks can achieve significantly higher statistical gain than low capacity networks.

Other modifications, variations, and applications of the present invention may be made in accordance with the above teachings other than as specifically described to practice the invention within the scope of the following claims.

I claim:

1. A method for estimating the cell loss rate of an asynchronous transfer mode statistical multiplexer for routing message traffic comprising the steps of:

finding a multiplexer state probability distribution of said multiplexer by performing the following steps:
    inputting a stream of cells from a plurality of traffic sources into a buffer;
    transferring the cells from the buffer to a communications channel;
    calculating the state probability distribution from a maximum cell transfer rate to the communications channel as a function of the buffer capacity; and
    estimating the cell loss rate from the multiplexer state probability distribution as approximately:

$$CL \approx \frac{\sum_{k=0}^{B} \left( \int_{a_k}^{\sum_{i=1}^{M} R_i N_i} (T - a_k) f_\gamma(T) dT \right) Pr(L=k)}{\sum_{i=1}^{M} \{R_i N_i \gamma_i\}}$$

wherein:
CL is cell loss probability,
B is the number of cells in the buffer,
C is the number of cells that may be transmitted by the multiplexer per time slot,
$R_i$ is the number of cells generated per time unit for traffic type i,
$N_i$ is the number of traffic sources of type i,
M is the number of traffic types,
$\gamma_i$ is a distribution parameter of an obn time for traffic source type i, $a_k$ is B−k+C,
Pr(L=k) is the probability that the number of cells L in the buffer is equal to k, $$\sigma^2 = \sum_{i=1}^{M} R_i^2 N_i \gamma_i (1 - \gamma_i),$$

$$\mu = \sum_{i=1}^{M} R_i N_i \gamma_i,$$

and $f_\gamma(T) = \frac{1}{K\sqrt{2\pi\sigma^2}} \theta^{\left\{\frac{-(T-\mu)^2}{2\sigma^2}\right\}}.$ 2. The method of claim 1 wherein the step of finding the multiplexer state probability distribution includes the following procedure:

k=0;
for $((i, j) \in S(B,M,\underline{N}))$ $(p^k)_{(i,j)} = x_{(i,j)},$ where $0 \leq x_{(i,j)} \leq 1$ and $$\sum_{(i,j) \in S(B,M,\underline{N})} x_{(i,j)} = 1;$$

for $((i,j) \in S(B,M,\underline{N}))$ $(p^{k+1})_{(i,j)} = 0;$ pick δ>0 as the exit threshold;
while $(|p^{k+1}_{(i,j)} - p^k_{(i,j)}| \geq \delta$ for any $(i,j) \in S(B,M,\underline{N}))$
{
k=k+1;
for $((i,j) \in S(B,M,\underline{N}))$
{
pick any $\epsilon_k$ such that $0 < \epsilon_k < 1$;

$(p^k)_{(i,j)} = (1 - \epsilon_k) p^{k-1}_{(i,j)} +$ $\epsilon_k \sum_{(l,m) \in S(B,M,\underline{N})} \xi\{i = \max(\min(l + \underline{R} \cdot \underline{m} - C, B), 0\} p_{j,m} p^{k-1}_{(l,m)};$

};

-continued $$S = \sum_{(i,\underline{j}) \in S(B,M,\underline{N})} p_{(i,\underline{j})}^k;$$

for $((i, \underline{j}) \in S(B, M, \underline{N})$ $$p_{(i,\underline{j})}^k = \frac{p_{(i,\underline{j})}^k}{S};$$

};

wherein:

k represents the iteration number;

(i,j) represents a state of the statistical multiplexer;

$p^k(i,j)$ represents a multiplexer state probability of (i,j) during iteration k;

M represents the number of traffic types;

N represents the number of traffic sources of each type;

B represents the cell buffer size of the multiplexer;

S(B,M,N) represents the set of all possible states of the multiplexer;

C represents the maximum cell transmission rate of the multiplexer; and $P_{j,m}$ represents a state transition probability from j to m.

3. The method of claim 1 wherein the step of estimating the cell loss rate includes the following formula:

$$\sum_{(i,\underline{j}) \in S(B,M,\underline{N})} \frac{\max\left(\sum_{j=1}^{M} R_j l_j - (B - i + C), 0\right)}{\sum_{j=1}^{M} R_j l_j} p_{(i,\underline{j})}$$

wherein:

i represents the number of cells in the multiplexer buffer;

(i,j) represents a state of the statistical multiplexer;

$p_{(i,\underline{j})}$ represents a multiplexer state probability of (i,j);

$R_i$ denotes the number of cells generated by an i-th type traffic source in a time slot during the traffic source's on periods;

$l_i$ represents the state of traffic source i;

M represents the number of traffic types;

N represents the number of traffic sources of each type;

B represents the cell buffer size of the multiplexer;

S(B,M,N) represents the set of all possible states of the multiplexer;

C represents the maximum cell transmission rate of the multiplexer; and $P_{j,m}$ represents a state transition probability from j to m.

4. The method of claim 1 wherein the step of finding the multiplexer state probability distribution includes the following procedure:

k=0;

$(p^k)_i=1/B$ for i=0,1,2, ..., B;

$(p^{k+1})_i=0$ for i=0,1,2, ..., B;

pick $\delta>0$ as the exit threshold;

while $(|p^{k+1}_i - p^k_i| < \delta$ for $0 \leq i \leq B)$

{ k=k+1;

for $(0 \leq j \leq B)$

{ pick $\epsilon_k$ such that $0 < \epsilon_k < 1$;

$$p_j^k = (1 - \epsilon_k)p_j^{k-1} + \epsilon_k \sum_{\underline{i} \in S_{i,j,\underline{i}}} Pr(\underline{I} = \underline{j})p_i^{k-1}$$

};

$$S = \sum_{j=0}^{B} p_j^k$$

for $(0 \leq j \leq B)$ $p_i^k = p_i^k / S;$

} wherein:

k represents the iteration number;

$p_i$ represents the multiplexer state probability that there are i cells in a buffer;

M represents the number of traffic types; and

B represents the cell buffer size of the multiplexer.

* * * * *